(12) United States Patent
Salyer et al.

(10) Patent No.: US 11,937,577 B2
(45) Date of Patent: Mar. 26, 2024

(54) PET HARNESS

(71) Applicants: Danielle Salyer, Denver, CO (US); Cynthia Rae Nelson, Longmont, CO (US); Stacey Cowan Tucker, Denver, CO (US); Meghan Higgins, Denver, CO (US); Marcy Ascarrunz, Lafayette, CO (US); Lynn Carol Rosen, Parker, CO (US)

(72) Inventors: Danielle Salyer, Denver, CO (US); Cynthia Rae Nelson, Longmont, CO (US); Stacey Cowan Tucker, Denver, CO (US); Meghan Higgins, Denver, CO (US); Marcy Ascarrunz, Lafayette, CO (US); Lynn Carol Rosen, Parker, CO (US)

( * ) Notice: Subject to any disclaimer, the term of this patent is extended or adjusted under 35 U.S.C. 154(b) by 221 days.

(21) Appl. No.: 17/469,406

(22) Filed: Sep. 8, 2021

(65) Prior Publication Data

US 2023/0069978 A1    Mar. 9, 2023

(51) Int. Cl.
*A01K 27/00*    (2006.01)

(52) U.S. Cl.
CPC .......... *A01K 27/008* (2013.01); *A01K 27/002* (2013.01)

(58) Field of Classification Search
CPC ..... A01K 27/008; A01K 27/002; A01K 27/00
See application file for complete search history.

(56) References Cited

U.S. PATENT DOCUMENTS

| | | | | |
|---|---|---|---|---|
| 5,297,835 | A * | 3/1994 | Wengler | B63H 20/36 294/157 |
| 5,887,772 | A * | 3/1999 | Dooley | A01K 27/008 119/858 |
| 7,918,192 | B1 * | 4/2011 | Digh | A01K 27/006 119/850 |
| 9,795,117 | B1 * | 10/2017 | Grant | A01K 13/007 |
| 2016/0157589 | A1 * | 6/2016 | Austin | A01K 27/008 224/258 |
| 2019/0124890 | A1 * | 5/2019 | Kath | A01K 1/0263 |
| 2021/0092938 | A1 * | 4/2021 | Hill | A01K 27/002 |
| 2022/0117199 | A1 * | 4/2022 | Rigoni | A01K 27/008 |

\* cited by examiner

*Primary Examiner* — Kristen C Hayes

(57) ABSTRACT

A lightweight, simple and comfortable pet harness with waste bag dispensing and storage pockets, and reflective piping on the harness edges and zipper pockets. The harness has only two single buckle straps which are designed to tuck into sections of the harness to avoid poking or sticking the pet.

13 Claims, 4 Drawing Sheets

007# PET HARNESS

FIELD

The invention relates to a novel pet harness designed to be comfortable for the pet and easy to use for the pet owner. The harness is simple yet has a sturdy handle grip and a waste pockets for dispensing and storing pet waste bags. Reflective piping is located on various edges and zipper pockets for maximum reflectivity at night.

BACKGROUND OF THE INVENTION

The invention most closely corresponds with USPTO Class 119 and subclass A01K1/0263 wherein Class 119 relates to animal husbandry and sub-class A01K1/0263 includes harnesses for pets.

In its simplest form, the invention comprises a novel pet harness that seeks to minimize the weight of the harness on the pet, and to create a comfortable restraining method for both the pet and the pet owner. The harness comes in sizes from small to XXL.

There are many harnesses and restraining devices for pets on the market. The aim is trying to produce something new and novel. The inventive harness accomplishes this in several ways. What may not be appreciated is that these devices may not be comfortable for the pet or easy for the pet owner to put on the pet. Too many buckles, pockets or other "features" does not necessarily make such harnesses a good thing. It is the goal of the inventive harness to minimize weight, and sharp points or buckles that might dig into the pet's skin as well as ease of use for the pet owner.

THE INVENTION

Summary, Objects and Advantages

The inventive harness has a dispensing section for waste bag, and a zippered pocket to place them in after the pet does their bathroom activity. Simplicity is the goal. The zipper pocket is made of a reflective material as is the dispensing section so the pet owner can take care of waste elimination while walking with the pet at night.

Shoulder strap and grab handle webbing are lightweight yet durable. The inside of the zipper pocket is also a lightweight woven material to keep the harness lightweight for the pet first, and owner second. There is also a d-ring on the bottom panel of the harness for connecting leashes. The ring is set to harness with reinforced webbing loop.

The top panel of the harness is a saddle shape. Wider at chest and rear, and with a cutout on each side of the panel. There are multiple reflective sections of piping on the front and back ends of the harness panel. The shoulder strap webbing is a single piece run under a piece of reflective binding and sewn at two places to create the grab handle. The strap continues out the opposite side wherein buckles create the connection point under the pet's chest area.

A one inch rubber opening is located on the top portion of the harness panel to dispense waste bags and is stitched through exterior fabric on top of the zippered pocket. The rear portion of the harness contains a reflective zippered pocket to dispose of the waste bags after use. The bottom panel has chest and shoulder webbing wherein the chest webbing is heat cut, stitched and reinforced to the bottom portion of the harness fabric loop, which is then stitched shut. Webbing continues through a ladder lock and to the end with a male buckle. Fabric loops have reflective piping on the edges of the loop.

BRIEF DESCRIPTION OF THE DRAWINGS

The invention is described in further detail by reference to sixteen (6) drawings sufficient in detail to describe the invention in which.

DETAILED DESCRIPTION, INCLUDING BEST MODES OF CARRYING OUT THE INVENTION

Figure 1:
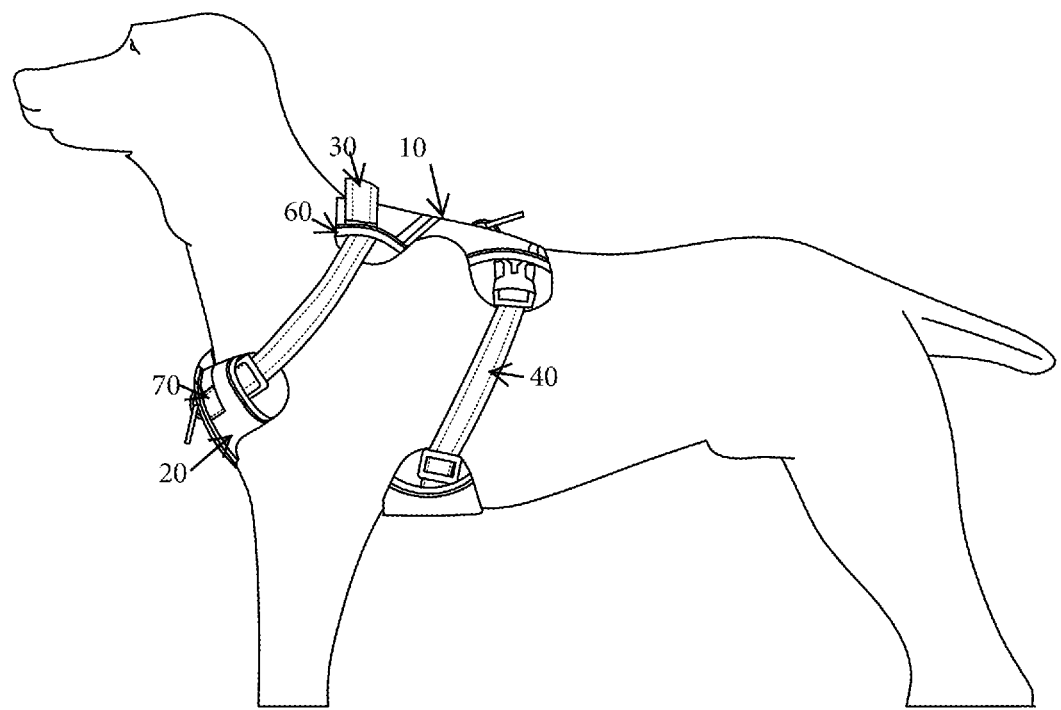
FIG. 1 is a side perspective of the harness on a dog.

FIG. 1 shows the harness in a side perspective on a model dog. The back shoulder section 10 connects to the chest section 20 but lightweight webbing upper 30 and lower 40 straps. Each are 1.5 inches wide. The upper or shoulder trap is connected to the bottom panel of the harness 50. Webbing travels through a fabric loop 60, through tri—glide 70 and through a plastic loop 80.

Figure 2:
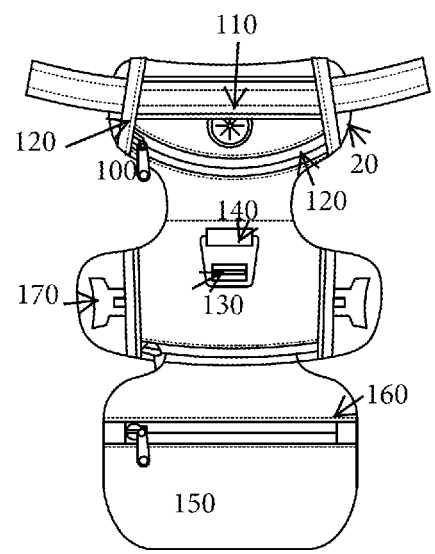
FIG. 2 is a top view with the harness laid out flat with zipper pocket extended.

FIG. 2 is a top perspective of the harness top panel 20 laid out with a reflective zipper waste bag pocket 100 and a one-inch diameter round rubber waste bag dispenser 110. Reflective piping 120 is located on either side of the zipper which provides access to insert a roll of dog waste bags. A 1.25"×1.125" Outward Hound D ring 130 is set to the harness exterior with 1" webbing loop 140. In this view the zippered waste pocket 150 is show tuned out for purposes of illustration only. The lightweight zipper pocket will deploy from inside of the storage pocket. The pocket can be pulled out and expanded for use and can be packed back into the storage pocket, inside the harness, when not in use. A 2-inch gusset at bottom and sides of pocket adds volume for receiving filled waste bags. ⅜" double fold reflective binding 160 finishes edges of side openings and zipper edges. Stitches are no less than ¼ inches. Female end of buckles 170 are set halfway into the side openings of the harness and secured to the interior with heat cut webbing.

Figure 3:
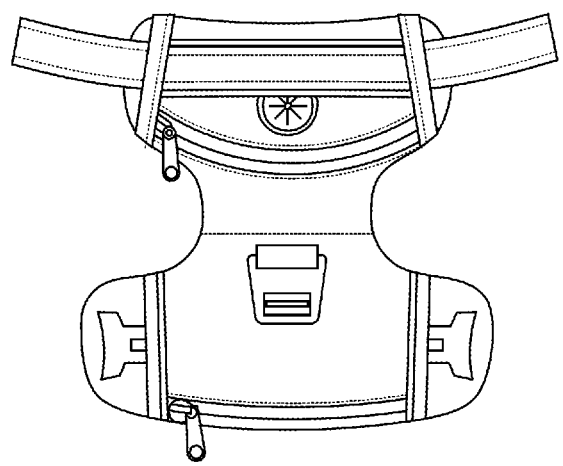
FIG. 3 is a top view of the harness with the zipper pocked tucked into the panel.

FIG. 3 illustrates the features of FIG. 2, however has the waste pocket tucked inside the harness as will be for actual use.

Figure 4:
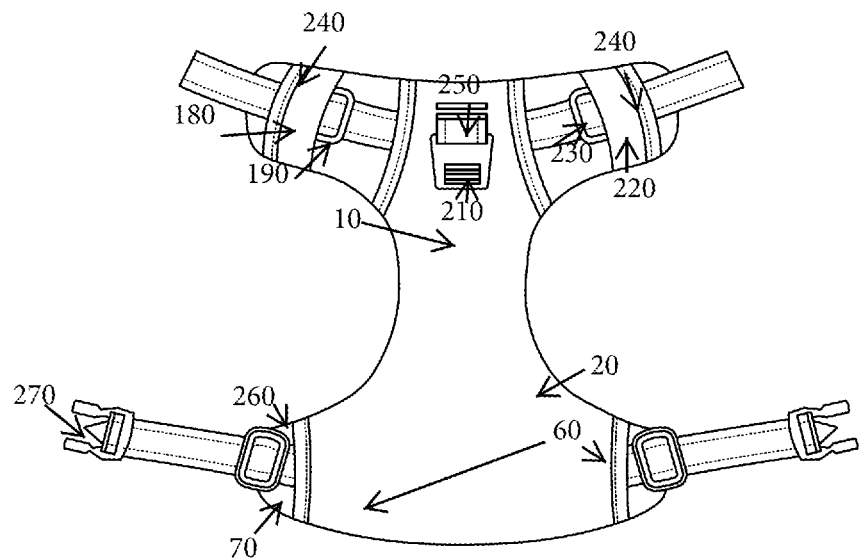
FIG. 4 is the bottom panel laid out.

FIG. 4 is the underside panel of the harness. Again, we see the shoulder section 10 and the chest section 20. A webbing loop 180 is set into exterior fabric 190 and secured with two bar tack stitches on both sides 200. A second d-ring 210 is set through the webbing loop. A tucked in plastic loop 220 is set halfway into the side openings 230 of the harness and secured to the interior with heat cut webbing. ¼ inch reflective binding 240 finishes edges of side openings. 1.5" webbing is heat cut, stitched and reinforced to the bottom panel of the harness at the edge of the opening 250. The opening is stitched shut. Webbing travels through a ladder lock 260 and through the male end 270 of the buckle. The webbing then travels back to be secured with the ladder lock. Webbing travels through a fabric loop 60, through tri-glide 70 and then travels back to be secured with a ladder lock.

Figure 5:
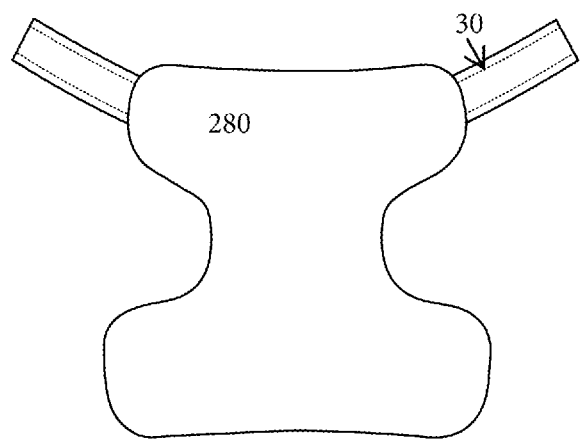
FIG. 5 is the underside of the top panel.

FIG. 5 illustrates the top panel underside view 280. The top panel underside is lined with knit material. Again, the shoulder webbing 30 is shown.

Figure 6:
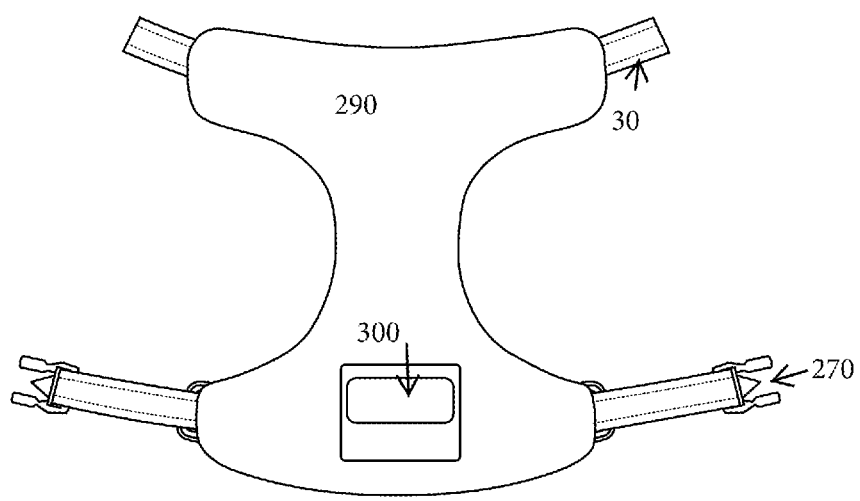
FIG. 6 is the underside of the bottom panel with name tag.

FIG. 6 is the underside of the bottom panel 290. As with the top panel, this panel is lined with a knit material for softness. A heat transfer label 300 is affixed to contain information about the pet and the owner. Again, the chest 30 and shoulder webbing 40 are shown, here with male buckle ends 270.

The invention claimed is:

1. A pet harness comprising;
  a) a single body panel with two material layers set together and a foam interior
  b) a single strip of shoulder webbing with a ladder lock, plastic loop and male/female buckle ends
  c) a single strip of chest webbing with a ladder lock, plastic loop and male/female buckle ends
  d) fabric loops for the shoulder and chest webbing loops to pass through
  d) a rubber opening to dispense inserted dog waste bags with zippered pocket
  e) an expandable zipper pocket to store dog waste bags
  f) a grab handle located on the top shoulder panel
  g) a D-ring on the top panel near the center of the harness
  h) reflective binding on multiple areas of the harness
  i) a heat transfer label for affixing to the underside of the harness
  j) underside harness knit fabric lining
  k) a separation stitch between the two zipper pockets.

2. A pet harness as in claim 1 wherein the body panel is wider at the shoulder and lower body or chest area with cutouts on each side to conform comfortably to the pet's body, and wherein two material layers are set together with turned construction with 3 mm foam interior, and wherein the top layer is a rip-top nylon, and the underside is a knit fabric.

3. A pet harness as in claim 1 wherein a single strip of shoulder webbing is 1.5 inches wide and is heat cut and secured at harness interior and exiting outside, and wherein the webbing extends from top shoulder panel opening and attaches to ladder locks on the bottom panel, a plastic loop is set halfway into the side openings of the harness and secured to the interior with heat cut webbing wherein the plastic loops are tucked in and away from the pet's body.

4. A pet harness as in claim 1 wherein the single strip of chest webbing is 1.5 inches wide and is heat cut, stitched and reinforced to the bottom panel of the harness at the edge of a fabric loop opening, and wherein the webbing travels through a ladder lock and through the male end of the buckle, and the webbing then travels back to be secured with the ladder lock, a plastic loop is set halfway into the side openings of the harness and secured to the interior with heat cut webbing wherein the plastic loops are tucked in and away from the pet's body.

5. A pet harness as in claim 1 wherein two fabric loops are located on the bottom panel in which the shoulder and chest webbing strips travel through to be able to connect at the buckle ends and have reflective piping set in along the outside edge of each fabric loop.

6. A pet harness as in claim 1 wherein a one-inch diameter rubber opening to dispense dog waist bags is stitched through exterior fabric on top of one zipper pocket and the fabric is laser cut in the center to provide an opening to the zipper pocket interior and has a reflective zipper pocket opening sized to fit a roll of waste bags.

7. A pet harness as in claim 1 wherein a lightweight reflective zipper pocket may deploy from inside of the storage pocket, and wherein the pocket can be pulled out and expanded for use and can be packed back into the storage pocket inside of the harness when not in use, and wherein a gusset fans out at bottom and sides of the pocket to form a two-inch wide section for added storage volume.

8. A pet harness as in claim 1 wherein a single grab handle is made of a one-inch webbing loop and is heat cut and set into exterior fabric, secured with two bar tack stitches on both sides, and wherein the webbing back side is lined with neoprene for comfort.

9. A pet harness as in claim 1 wherein a 1.25"×1.125" D-Ring is set to the harness exterior with one-inch webbing loop and wherein the webbing loop is set into exterior fabric and secured with two bar tack stitches on both sides, and wherein the D-Ring is set through the webbing loop.

10. A pet harness as in claim 1 wherein reflective binding or piping is 3/8" double fold located on finish edges of the fabric loops for webbing straps and zipper edges.

11. A pet harness as in claim 1 wherein a heat transfer label provides space for pet owner information and is then heat transferred onto the underside of the harness via a standard ironing process once the owner has completed the label information.

12. A pet harness as in claim 1 wherein the underside of the body panel is a knit fabric which is turned construction layered to the top panel with a 3 mm foam interior.

13. A pet harness as in claim 1 wherein a separation stitch is set between the waste bag dispensing pocket and the waste bag storage pocket and is stitched through all three layers of the body panel to separate internal pocket space.

* * * * *